(12) United States Patent
Junk

(10) Patent No.: US 12,231,582 B2
(45) Date of Patent: Feb. 18, 2025

(54) METHOD FOR ATTESTATION OF AN ELECTRONIC COMPONENT ON A CIRCUIT BOARD

(71) Applicant: GM GLOBAL TECHNOLOGY OPERATIONS LLC, Detroit, MI (US)

(72) Inventor: Kenneth William Junk, Marshalltown, IA (US)

(73) Assignee: GM Global Technology Operations LLC, Detroit, MI (US)

( * ) Notice: Subject to any disclaimer, the term of this patent is extended or adjusted under 35 U.S.C. 154(b) by 362 days.

(21) Appl. No.: 17/832,109

(22) Filed: Jun. 3, 2022

(65) Prior Publication Data

US 2023/0396447 A1 Dec. 7, 2023

(51) Int. Cl.
*H04L 9/32* (2006.01)
*G06F 21/81* (2013.01)

(52) U.S. Cl.
CPC ............ *H04L 9/3252* (2013.01); *G06F 21/81* (2013.01); *H04L 9/3239* (2013.01); *H04L 9/3271* (2013.01); *H04L 2209/84* (2013.01)

(58) Field of Classification Search
CPC ... H04L 9/3252; H04L 9/3239; H04L 9/3271; H04L 9/3247; H04L 2209/84; G06F 21/81
See application file for complete search history.

(56) References Cited

U.S. PATENT DOCUMENTS

| | | | |
|---|---|---|---|
| 2003/0009687 A1 | 1/2003 | Ferchau et al. | |
| 2007/0271383 A1* | 11/2007 | Kim | H04B 3/546 709/227 |
| 2017/0324704 A1 | 11/2017 | Wood et al. | |
| 2017/0346640 A1* | 11/2017 | Smith | H04L 9/0825 |
| 2020/0029209 A1 | 1/2020 | Nölscher et al. | |
| 2020/0145419 A1* | 5/2020 | Yitbarek | H04L 63/0853 |
| 2023/0093992 A1 | 3/2023 | Shah et al. | |

OTHER PUBLICATIONS

Aida Abdon Diop, "Cryptographic mechanisms for device authentication and attestation in the internet of things", Cryptography and Security [cs.CR], Institut Polytecnique de Paris, 2020, English. NNT: 2020IPPAS023, 190 pages.

(Continued)

*Primary Examiner* — Sangseok Park
(74) *Attorney, Agent, or Firm* — Quinn IP Law

(57) ABSTRACT

A method for attestation of electronic components includes operating a system including the components. The components are configured for electronic communication with each other. A first electronic component provides plug-in hardware and/or configurable software. The method includes utilizing a second electronic component to perform attestation upon the first component using asymmetric key cryptography to verify authenticity. When using the asymmetric key cryptography successfully verifies the authenticity, the method includes selectively enabling one of power or data to the first component and communicating between the first component and the plurality of components to achieve tangible functions. When the cryptography fails to successfully verify the authenticity, the method includes selectively withholding one of power or data connection the first component.

19 Claims, 6 Drawing Sheets

(56) References Cited

OTHER PUBLICATIONS

Elaine Palmer, "Attestation of System Components v1.0 Requirements and Recommendations", Open Compute Project, Nov. 4, 2020, 38 pages.
Wikipedia, "Diffie-Hellman key exchange", Apr. 8, 22, 12 pages.
Intel, "PCI Express Device Security Enhancements", Version 0.71, Sep. 2018, 46 pages.

* cited by examiner

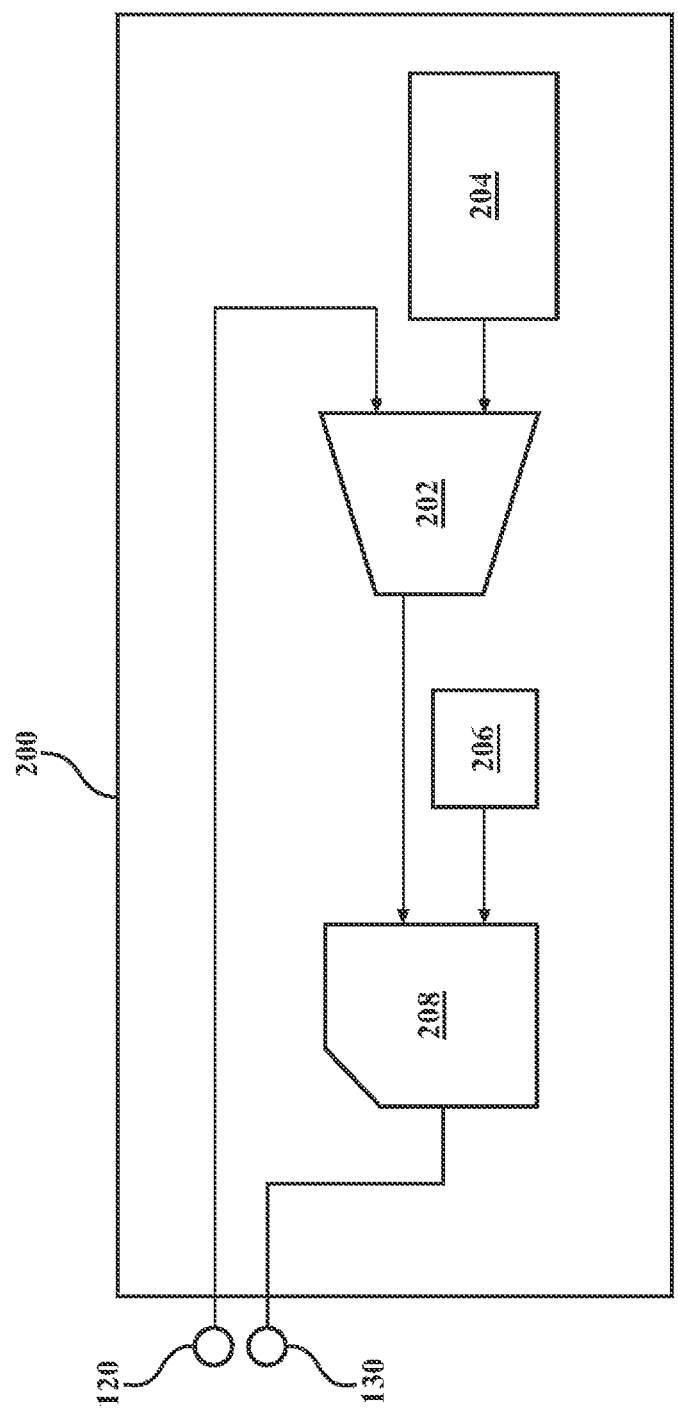

METHOD FOR ATTESTATION OF AN ELECTRONIC COMPONENT ON A CIRCUIT BOARD

INTRODUCTION

The disclosure generally relates to a method for attestation of an electronic component to a circuit board.

A vehicle utilizes computerized hardware and software to control operations of various systems within the vehicle. Computerized hardware may include a circuit board. Some physical components or devices are attached to the circuit board permanently or are soldered to the circuit board. Other devices are replaceable or may be upgraded by removing an old device and replacing it with a new device.

SUMMARY

A method for attestation of a plurality of electronic components includes operating a system including the plurality of electronic components. The components are configured for electronic communication with each other. A first electronic component of the plurality of electronic components provides one of plug-in hardware, configurable hardware, updatable software, configurable software, updatable firmware, configurable firmware, or updatable ownership information to the system. The method further includes utilizing a second electronic component of the plurality of electronic components to perform the attestation upon the first electronic component using asymmetric key cryptography to verify authenticity of the first electronic component. When using the asymmetric key cryptography successfully verifies the authenticity of the first electronic component, the method further includes selectively enabling one of a power connection or a data connection to the first electronic component and communicating between the first electronic component and a remainder of the plurality of electronic components to achieve tangible functions that may be provided by the plurality of electronic components. When using the asymmetric key cryptography fails to successfully verify the authenticity of the first electronic component, the method further includes selectively withholding one of the power connection or the data connection to the first electronic component.

In some embodiments, the method further includes, when using the asymmetric key cryptography successfully verifies the authenticity of the first electronic component, utilizing the first electronic component to perform attestation upon the second electronic component.

In some embodiments, the method further includes, when using the asymmetric key cryptography successfully verifies the authenticity of the first electronic component, utilizing the first electronic component to perform attestation upon a third electronic component of the plurality of electronic components.

In some embodiments, operating the system further includes connecting the plurality of electronic components to a central compute unit (CCU) including a circuit board.

In some embodiments, the second electronic component is soldered to the circuit board. The method may further include defining the second electronic component as a trusted device acting as a verifier and defining the electronic component as an attester under verification In some embodiments, the second electronic component is one of a board management controller, a peripheral component interconnect express switch, an Ethernet switch, a dedicated hardware security module.

In some embodiments, the method further includes communicating with a remote server device to establish the second electronic component as a trusted device.

In some embodiments, using asymmetric key cryptography includes using one of an Edwards-curve Digital Signature Algorithm, an Elliptic Curve Digital Signature Algorithm, or a digital signature algorithm.

In some embodiments, communicating between the first electronic component and a remainder of the plurality of electronic components includes utilizing symmetric key cryptography.

In some embodiments, operating the system further includes receiving the first electronic component as a plug-in device.

In some embodiments, receiving the first electronic component includes connecting the first electronic component to the system with one of a peripheral component interconnect express link, a wireless link, an Ethernet link, and a serial link.

In some embodiments, utilizing a second electronic component of the plurality of electronic components to perform the attestation upon the first electronic component includes performing the attestation at one of a system boot and after a device reset.

According to one alternative embodiment, a method for attestation of an electronic component upon a circuit board is provided. The method includes operating an electronic device including the circuit board, a microcontroller attached to the circuit board, and the electronic component attached to the circuit board. The electronic component provides one of plug-in hardware, configurable hardware, updatable software, configurable software, updatable firmware, configurable firmware, or updatable ownership information to the electronic device. The method further includes defining the microcontroller as a trusted device acting as a verifier, defining the electronic component as an attester under verification, and using asymmetric key cryptography to verify authenticity of the attester under verification with the verifier. When using the asymmetric key cryptography successfully verifies the authenticity of the attester under verification, selectively enabling one of a power connection and a data connection to the electronic component and communicating between the electronic component and the microcontroller to achieve tangible functions that may be provided by the electronic component and the microcontroller. When using the asymmetric key cryptography fails to successfully verify the authenticity of the attester under verification, the method further includes selectively withholding one of a power connection and a data connection to the electronic component.

In some embodiments, the microcontroller is soldered to the circuit board.

In some embodiments, the electronic device is a first electronic device. Defining the microcontroller as the trusted device includes verifying the microcontroller as the trusted device with a second electronic device external to the first electronic device.

In some embodiments, defining the microcontroller as the trusted device includes verifying the microcontroller as the trusted device with a remote server device communicating with the electronic device through a wireless communication network.

In some embodiments, the electronic device includes a central compute unit installed to a vehicle. The microcontroller includes one of a board management controller of the central compute unit, an Ethernet switch unit of the electronic device, or a peripheral component interconnect express switch unit of the electronic device. In some embodiments, verifying authenticity of the attester under verification includes generating a challenge from the verifier to the attester under verification and, within the attester under verification, answering the challenge with a reply signed with a private key. Answering the challenge includes collecting measurements within the attester under verification, combining the measurements with the challenge with a hash function to create a digest, signing the digest with the private key to create a signed digest; and answering the challenge by sending the signed digest to the verifier. Verifying authenticity of the attester under verification further includes, within the verifier, confirming accuracy of the reply by checking the reply with a public key, the challenge, and reference manifest data and verifying authenticity of the attester based upon the accuracy of the reply.

In some embodiments, collecting the measurements includes collecting immutable measurements and mutable measurements.

In some embodiments, the immutable measurements include one of a chip manufacturer identifier, a name of the attester under verification, or a custom identifier. The mutable measurements include one of a hash of a bootloader image, a software image, a configuration, a representation of ownership, and results from a secure boot operation.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIGS. 2A and 2B schematically illustrate data flow related to an attester device providing attestation to a verifier device, in accordance with the present disclosure;

FIG. 2A illustrates the verifier device 100; and

FIG. 2B illustrates the attester device;

DETAILED DESCRIPTION

Figure 1:
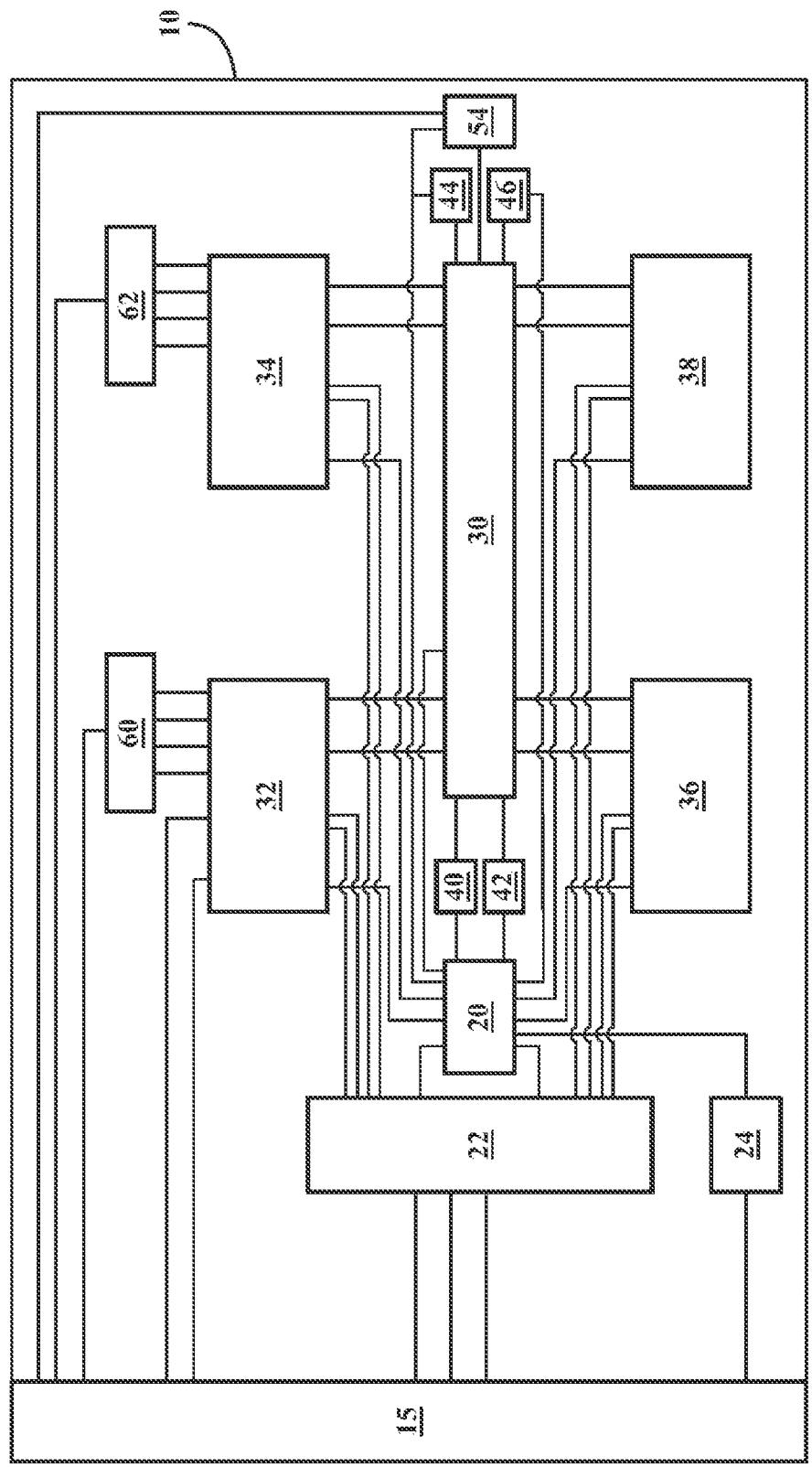
FIG. 1 schematically illustrates a central compute unit (CCU) including a board management controller configured for verifying authenticity of electronic components attached to the CCU, in accordance with the present disclosure.

A system and method are provided including hardware configured for attestation of electronic components within electrical assemblies with field replaceable, upgradeable, serviceable, or otherwise configurable components. In one embodiment, the system and method may authenticate field replaceable electronics modules on a central compute unit (CCU) of a vehicle through attestation. A CCU may include a circuit board and a plurality of electronic devices or electronic components connected to the circuit board. Some of the electronic components may be permanently attached or soldered to the circuit board. Some of the electronic components may be removably attached to the circuit board and may be considered plug-in devices which may be swapped in and out of use with the CCU. In another embodiment, the disclosed system and method may include a plurality of electrical components in electronic communication with each other although some or all of the components are not attached to a CCU.

Attestation measures and characterizes immutable and mutable components and cryptographically compares the results against a reference manifest. This is done at boot, after device resets (hot adds/hot swaps), or after defined system events. For peripheral component interconnect express (PCIe) modules, secure boot does not provide any protection against malicious content being introduced onto the bus since external components have no way of knowing that secure boot was performed or was successful. With attestation, counterfeit, malicious or rogue modules can be identified and blocked. Attestation may detect changes in hardware, software, configuration, and ownership.

The disclosed system and method may work with plug-in components to a circuit board, including a variety of electronic devices that may be selectively connected to the circuit board and replaced by alternative electronic devices. PCIe is one configuration for attaching plug-in components to a circuit board. PCIe presents two challenges. First, modular components can be replaced with compromised devices or entirely new peripherals (e.g., NVMe→fifth generation (5G) radio). Second, legitimate components can become compromised at runtime and any PCIe device can talk with any other PCIe device. Attestation can be used to authenticate hardware, firmware, software, and ownership of a plug-in module. Moreover, mutual authentication between the SoCs and verifier may be used to establish trust for device configuration. This may be used to make sure that valid configuration data is used to form established expected paths in the system. Attestation by itself cannot protect against active man-in-the-middle (MitM) attacks, wherein a malicious device is installed between two legitimate devices and mimics behavior from one device to the other; however, when combined with an encrypted channel, MitM attacks may be foiled.

One may operate a CCU configuration enabling use of a system-on-a-chip (SoC), including the root complex, which may be replaced. An SoC is an integrated circuit that includes all or most of the components that make up a computer. The CCU board management controller or power management microcontroller (MCU) may be used as a verifier to authenticate attesters such as SoCs, a PCIe switch, and nonvolatile memory express (NVMe) through a sideband interface (universal asynchronous receiver/transmitter (UART)/serial peripheral interface (SPI)/inter-integrated circuit communication (I2C)). Moreover, attestation requires cryptographically hashing a device measurement, such as the software image, which is useful for detecting changes but takes time. To minimize attestation at boot, the results of the secure bootloader may be used to characterize valid software without having to revalidate the software for attestation. This also allows firmware and software to be updated and by characterizing secure boot results, attesters and verifiers do not have to keep track of future firmware or software manifests.

SoCs may be utilized for a wide variety of purposes. In a vehicle application, SoCs may control vehicle systems such as motor or brake operation. SoCs may control entertainment systems, such as a radio device or a telematics system.

SoCs may include expandable options, such as installing a gaming console such as Xbox® into the vehicle.

One may utilize a slight variation of the attestation including starting the system up with the PCIe bus blocked and have the verifier authenticate the SoCs. Once authenticated, the bus can be enabled and the now trusted SoCs can verify secondary peripherals, such as NVMe storage units.

To protect SoCs when they are stand-alone devices—for example, when components are sold on the used market—the SoCs can use attestation to authenticate the board controller and power management MCU. This will prevent malicious configuration or initialization through side channels.

The disclosed system and method may include attestation of removable and replaceable modules on a vehicle CCU. The verifier may be a board controller and power manager MCU or a PCIe switch. The attester may be an SoC, a PCIe switch, or an NVMe storage device. Different digital signature schemes may be utilized, including Edwards-curve Digital Signature Algorithm (EdDSA) or hash-based message authentication code (HMAC). The disclosed method may be performed when a module is hot added or hot swapped. Mutual attestation may be used.

In one embodiment, a plurality of free standing modules may be connected into various different configurations which may or may not include a CCU. For example, a module can be purchased and installed in a debugger and modified through any open communications port, including an unconnected I2C, SPI, or PCIe link. By having the module authenticate the unit it is plugged into, the module can close off all communications until it has been installed in a trusted CCU. This procedure may prevent the module from being modified before it has been installed.

Symmetric or asymmetric key cryptography may be used, depending upon the type of authentication code utilized. Asymmetric key cryptography may be significantly more secure than symmetric key cryptography. Asymmetric key cryptography is substantially slower than symmetric key cryptography. In one embodiment, a method to use attestation to authenticate components connected to a CCU may include initially utilizing asymmetric key cryptography to perform attestation. Asymmetric key cryptography may be utilized in the disclosed method, starting with a trusted root device or a group of trusted root devices and building trust with other components by challenging the other components through attestation. Once the other components are trusted and their authenticity has been verified, symmetric public/private key pairs may be distributed among the trusted components, and the various components may then utilize symmetric cryptography to communicate with each other with excellent communication speed. In this way, asymmetric key cryptography may be utilized to establish trust among the electronic components, and then symmetric key cryptography may be utilized for continued operation of the components to take advantage of the reduced calculation times associated with symmetric key cryptography.

In one embodiment, soldered components on the CCU main board are considered trusted and do not need to be authenticated. These trusted components may be utilized as verifiers or to verify the untrusted or not yet trusted components. Such devices may include a board management controller, a PCIe switch, an Ethernet switch, or a dedicated hardware security module (HSM).

In one embodiment, the verifier disables the PCIe bus by holding it in reset to withhold access to data transfer/isolate components while the attestation process is performed. In another embodiment, the verifier may additionally or alternatively remove power from unauthenticated or not-yet-authenticated devices.

In one embodiment, a verifier may send a challenge to a not yet trusted component or an attester under verification (AUV). The AUV collects immutable and mutable measurements. The immutable measurements may include a chip manufacturer identifier, an ECU name, or a custom identifier. The mutable measurements may include a hash of the bootloader image, software image, or configuration. The mutable measurements include results from the secure boot operation.

Referring now to the drawings, wherein like reference numbers refer to like features throughout the several views, FIG. 1 illustrates an electronic device with a microcontroller embodied as a CCU 10 including a board management controller 20 configured for verifying authenticity of electronic components attached to the CCU 10. The board management controller 20 may be embodied as a power management unit MCU and may additionally be able to configure SoCs, switches, and NVMe drives. The CCU 10 is illustrated including a PCIe switch 30, a slot A—computer main unit 32, a slot B—compute unit addon #1 34, a slot C—compute unit addon #2 36, and a slot D—compute unit addon #3 38. The CCU 10 is illustrated further including an NVMe unit #1 40, an NVMe unit #2 42, an NVMe unit #3 44, and an NVMe unit #4 46. The CCU 10 is illustrated further including connectors 15, an Ethernet switch unit 22, a power tree 24, a 'PCIe retimer 54, a video input unit #1 60, and a video input unit #2 62.

The CCU 10 is provided as an exemplary electronic device with a microcontroller. The disclosed system and method may be utilized with other embodiments of electronic devices with microcontrollers, for example, including Ethernet switches, gateways traditional engine control units, battery packs, etc. In one embodiment, the electronic device may include an ability to receive or accept electronic components as removable/upgradeable attachments, with the disclosed system and method being utilized to authenticate those attached electronic components and avoid counterfeit and/or malicious components. In another embodiment, the electronic device with a microcontroller operating the disclosed system and method may not accept electronic components as attachments, but the system and method may authenticate the software on the electronic components installed to the device. For example, an electronic device including a microcontroller embodied as a telematics controller installed to a vehicle may include all factory installed physical components. However, the controller may accept downloadable software applications, and these downloaded applications may be corrupted and cause a component to the telematics controller to go rogue. In another embodiment, the disclosed system and method may be useful to identify and potentially isolate software that may have been downloaded to the electronic component without the knowledge of the user. The disclosed system and method may require attestation from the rogue component, and the corrupted software may have lost the ability to attest to challenges correctly and may therefore be isolated according to the disclosure.

The CCU 10 operates as a computerized unit. The slot A—computer main unit 32 includes a processor, random-access memory (RAM), and memory storage and may provide computerized function, executing programming which may include an operating system. The PCIe switch 30, in combination with the slot B—compute unit addon #1 34, the slot C—compute unit addon #2 36, and the slot D—compute unit addon #3 38, provide expandable options, wherein SoCs may be installed to any of the slot B—compute unit addon #1 34, the slot C—compute unit addon #2 36, and the slot D—compute unit addon #3 38. The flexibility provided by the slots 34, 36, and 38 may be beneficial to operation of a vehicle including the CCU 10 and may provide versatility to the owner of the vehicle. However, the ability to add SoCs and other computerized devices to the CCU 10 may open possibilities of counterfeit hardware or counterfeit software being connected to the CCU 10 and operating with the vehicle. The disclosed system and method provide an ability to allow the vehicle owner to take advantage of the versatility of the slots 34, 36, and 38 while protecting the vehicle from adverse effects of counterfeit hardware or software. The illustrated CCU 10 is exemplary. Architectural practices for hardware such as CCU 10 change over time, and the disclosed system and method are useful to authenticate and selectively isolate electronic components to a system such as CCU 10 despite foreseeable differences in system architecture.

Board management controller 20 includes an Ethernet data connection to the Ethernet switch unit 22. A remainder of the illustrated connections from the board management controller 20 are power connections or connections that enable the board management controller 20 to provide or withhold power from the connected component. The Ethernet switch unit 22 receives power through a connection to the board management controller 20. The Ethernet switch unit 22 further includes Ethernet data connections to each of the slots 32, 34, 36, and 38 and the board management controller. The PCIe switch 30 includes PCIe data connections to each of the slots 32, 34, 36, 38, the NVMe units 40, 42, 44, and 46, and the PCIe retimer 54.

Attestation may be performed in-band (PCIe) or out-of-band (SPI, I2C, etc.) or a combination of both. NVMe drives can be placed in an external bay and connected to the CCU 10 with a PCIe cable. Moreover, PCIe retimer 54 acts as a connector between the PCIe switch and an external component through a cable. In one embodiment, PCIe retimer 54 may connect CCU 10 with a secondary CCU.

Attestation is useful for two purposes: 1) identify unauthenticated components and 2) isolate unidentified components. The green lines indicate Ethernet connections and a verifier can be some other device somewhere on the Ethernet network. Moreover, attestation does not need to be performed by a single verifier; one may run attestation using multiple verifiers (external Ethernet verifier and board management controller, etc.) There are two cases to consider—the CCU where something is plugged into it and a cartridge or module that is plugged into something.

The disclosed system and method may build trust among the components attached to the CCU 10. In one embodiment, components permanently attached or soldered to the CCU 10 may be considered trusted. The board management controller 20, the PCIe switch 30, and the Ethernet switch unit 22 may be soldered to the CCU 10. One may know with certainty that these originally installed components soldered to the CCU 10 are trustworthy and may be utilized as verifiers or components that challenge attester components or AUVs. In another embodiment, two or more components may mutually challenge each other, and the group may build trust in each other through passing attestation.

Any of the slot A—compute main unit 32, the SoCs attached to the slots 34, 36, and 38, the PCIe switch 30, and the NVMe units 40, 42, 44, and 46 may be an AUV subject to challenge. The PCIe switch 30 may be a fanout switch or a fabric switch. While the AUV is being challenged, the CCU 10 and specifically the verifier may withhold power, authority to transmit and receive data freely, or both. The board management controller 20 controls data transfer and power distribution to the various components attached to the CCU 10 and may be used as the primary verifier in the disclosed system and method. In other embodiments, the PCIe switch 30 or the Ethernet switch unit 22 may be utilized to isolate an AUV while it is being challenged, for example, by preventing any data from being transmitted or received from the AUV except to answer the challenge, for example, by disabling a PCIe bus by holding the PCIe bus in reset. In some embodiments, an attester, once gaining trust becoming verified, may switch roles and become a verifier to other components that are still AUVs. For example, the board management controller 20 may authenticate an SoC plugged in to one of the slots 34, 36, and 38 and may authenticate the Ethernet switch unit 22, and, once authenticated, the authenticated SoC or the authenticated Ethernet switch unit 22 may act as a verifier for one or more of the NVMe units 40, 42, 44, and 46.

A challenge from a verifier to an attester may include the verifier sending a challenge to an AUV. The AUV collects immutable and mutable measurements. The measurements are combined with the challenge using a hash function. A digest of the measurements and the challenge may be signed with a private key using EdDSA. The AUV sends the signature or signed digest and a public key to the verifier. The verifier combines a reference manifest and the challenge using a hash function. The verifier may then verify the signature using the public key, the signature, the reference manifest, and the challenge digest using EdDSA. If the signature check fails, the verifier may disable power to the AUV. The verifier may further or alternatively post an alert if the signature check fails. This process may continue, iterating for each of the AUVs.

In one embodiment, an attester such as an SoC may be configured for authenticating the verifier. For example, some malicious modules may imitate a verifier, sending a challenge to an AUV in hopes of receiving a signature/data that may be mimicked to hide the malicious module from the verifier. An SoC may respond to a challenge from a verifying with a counter-challenge. The component initially acting as a verifier switches roles and generates a signed digest to return to the SoC. Once the SoC receives a conforming reply from the verifier, then the SoC may initiate the disclosed process to attest its identity to the verifier.

The verifier may calculate the reference digest using measurements and the challenge. The verifier may verify the reference digest using the signature and the public key. The verifier may enable use of the PCIe bus after all of the attester devices are authenticated successfully or after any non-conforming devices are successfully isolated.

The disclosed attestation method may be performed at boot, after resets, and after predefined events.

Figure 2A:
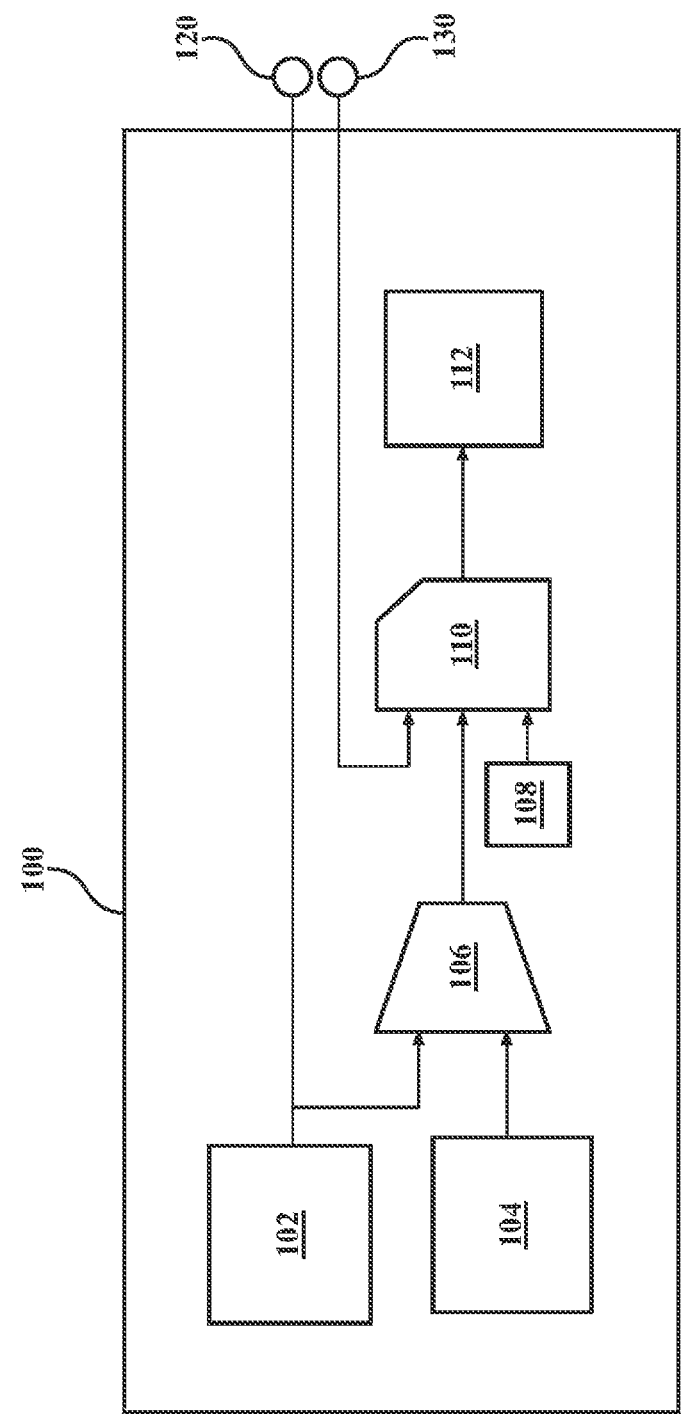

FIGS. 2A and 2B collectively schematically illustrate data flow related to an attester device 200 providing attestation to a verifier device 100. FIG. 2A illustrates the verifier device 100. A challenge command 102 is generated as part of a boot or reset event. The challenge command 102 is provided to the attester device 200 of FIG. 2B as pass-through signal 120, and additionally the challenge command 102 is provided to a hash function operator 106. The hash function operator 106 includes a secure hash algorithm.

In one embodiment, SHA-2 includes a family of secure hash algorithms, including SHA-224, SHA-256, SHA-384, and SHA-512. SHA-256 is a SHA-2 algorithm that produces a 256-bit digest (output). Secure hash functions are one-way functions where arbitrary input ('message') is mapped to a fixed length output ('digest'). A single bit change to the input will produce significantly different outputs. One-way functions mean that it is impractical to invert the results. In other words, given a digest, there is no practical way other than trail-and-error to determine the input.

FIG. 2B illustrates the attester device 200. The challenge command 102 is received as pass-through signal 120 and is provided to a hash function operator 202 of the attester device 200. The hash function operator 202 combines the challenge command 102 with measurements 204 through a hash function. The combined challenge command and measurements digest is provided to an EdDSA sign operation 208, which signs the digest with a private key 206. The signed digest is provided back to the verifier device 100 of FIG. 2A as pass-through signal 130, along with a public key/certification chain. The public key is stored by the attester device 200 and may be sent to other devices in reply to a "get cert." command from the other devices. The certification chain may be used to verify that the public key is recognized.

In FIG. 2A, the signed digest and the public key/certification chain are received as pass-through signal 130. The challenge command 102 is combined with a reference manifest 104 by the hash function operator 106 through a hash function. The combined challenge command and reference manifest data is provided to an EdDSA verify operation 110, which additionally receives the pass-through signal 130 including the signed digest from the attester device 200 and a public key 108. A pass/fail signal 112 is generated by the EdDSA verify operation 110, indicating whether the attester device 200 is authenticated (pass) or the attester device 200 failed authentication (fail).

Figure 3:
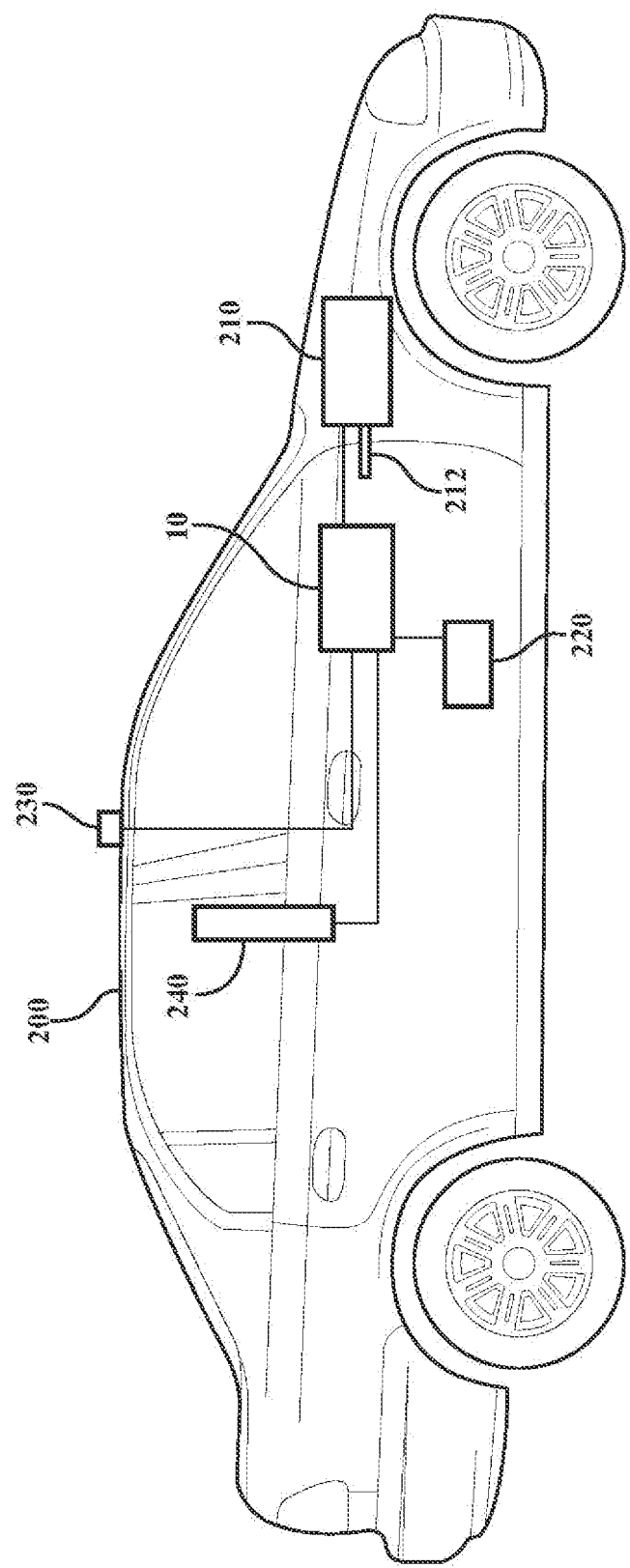
FIG. 3 illustrates an exemplary device including a vehicle including the CCU and a plurality of other vehicle systems which may be controlled by the CCU, in accordance with the present disclosure.

FIG. 3 illustrates an exemplary attester device 200 including a vehicle including the CCU 10 and a plurality of other vehicle systems which may be controlled by the CCU 10. The device 200 includes the CCU 10, an electric machine 210 configured for providing an output torque through an output component 212, a braking system 220, a wireless communication receiver and antenna 230, and a rear seat entertainment system 240. The disclosed system and method enable the CCU 10 to provide computerized control over the illustrated vehicular systems with confidence that modules within the CCU 10 and the software thereof are authenticated and will provide operation of the device 200 according to parameters intended by the manufacturer.

Figure 4:
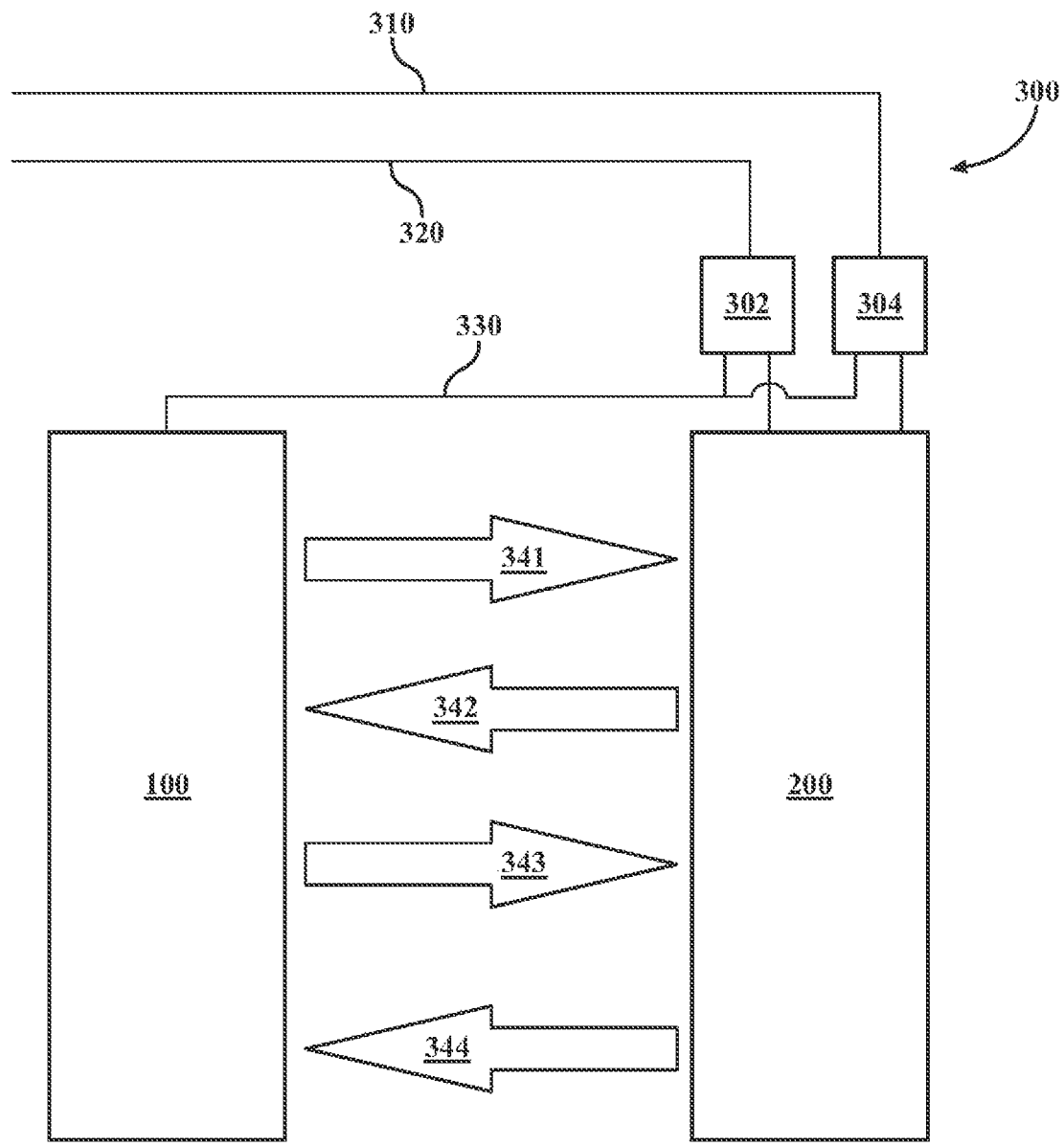
FIG. 4 schematically illustrates an exemplary system for attestation of peripheral component interconnect express (PCIe) components, in accordance with the present disclosure.

FIG. 4 schematically illustrates an exemplary system 300 for attestation of PCIe components. The verifier device 100 of FIG. 2A and the attester device 200 of FIG. 2B are illustrated. The verifier device 100 and the attester device 200 may be directly connected with a direct serial connection. A power supply 310 and a data bus connection 320 are illustrated. A power supply switch 304 and a data access switch 302 are additionally illustrated. The verifier device 100 is illustrated including a control signal 330, which is configured for controlling the power supply switch 304 and a data access switch 302. Depending upon control signals provided by the verifier device 100, the attester device 200 is either provided access to power and data by switches 304, 302, respectively, or denied access. A challenge action 341 is provided by the verifier device 100 to the attester device 200. The attester device 200 is programmed to counteract MiTM attacks and is thus programmed to provide a counter challenge action 342 to the verifier device 100. The verifier device 100 operates the disclosed method to create a signed digest proving the authenticity of the verifier device 100 and the challenge action 341 by providing challenge answer action 343. As a result of receiving a valid challenge answer from the verifier device 100, the attester device 200 includes programming to go forward to answer the challenge action 341 by providing challenge answer action 344, operating the disclosed method to create a signed digest proving the authenticity of the attester device 200.

Figure 5:
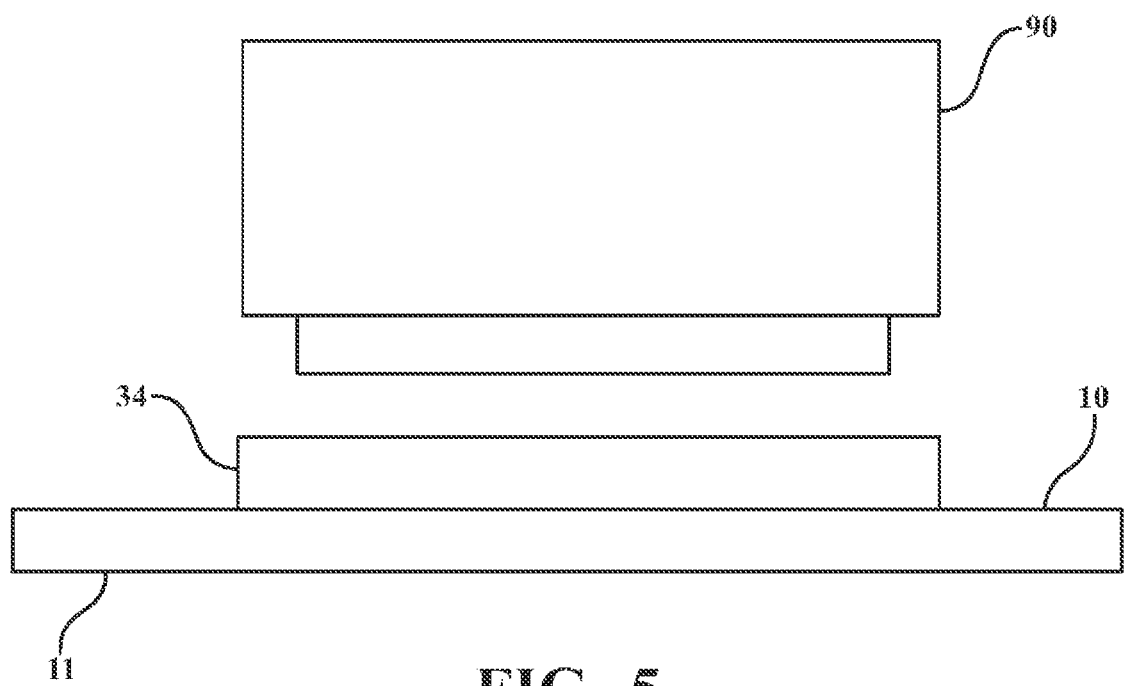
FIG. 5 schematically illustrates an exemplary system-on-a-chip (SoC) unit being plugged into the slot B—compute unit addon number one of the CCU, in accordance with the present disclosure.

FIG. 5 illustrates an exemplary SoC unit 90 being plugged into the slot B—compute unit addon #1 34 of the CCU 10. The SoC unit 90 includes a PCIe connector configured for plugging in to a mating connection on the slot B—compute unit addon #1 34 connected to circuit board 11.

The disclosed electronic components and combinations thereof may be configured for achieving a wide variety of tangible functions. In a plurality of non-limiting examples, the electronic components may control access and content of an entertainment system, operation of wireless communications, navigational instructions provided to a unit or device, monitoring of sensors and processing of sensor information, operation and speed of an electric motor, and various functions in a vehicle such as navigation, propulsion, braking, environmental systems, wipers, headlights, and infotainment within the vehicle. The disclosed system and method provide increased security to these systems to avoid unintended, malicious, unauthorized, rogue, or otherwise inappropriate operation of these systems and their tangible outputs.

While the best modes for carrying out the disclosure have been described in detail, those familiar with the art to which this disclosure relates will recognize various alternative designs and embodiments for practicing the disclosure within the scope of the appended claims.

What is claimed is:

1. A method for attestation of a plurality of electronic components, comprising:
operating a system including:
the plurality of electronic components configured for electronic communication with each other, wherein a first electronic component of the plurality of electronic components provides one of plug-in hardware, configurable hardware, updatable software, configurable software, updatable firmware, configurable firmware, or updatable ownership information to the system; and
connecting the plurality of electronic components to a central compute unit including a circuit board;
utilizing a second electronic component of the plurality of electronic components to perform the attestation upon the first electronic component using asymmetric key cryptography to verify authenticity of the first electronic component, wherein the second electronic component is attached to the circuit board;
defining the second electronic component as a trusted device acting as a verifier;
defining the electronic component as an attester under verification;
when using the asymmetric key cryptography successfully verifies the authenticity of the first electronic component:
selectively enabling one of a power connection or a data connection to the first electronic component; and
communicating between the first electronic component and a remainder of the plurality of electronic components to achieve tangible functions that may be provided by the plurality of electronic components; and when using the asymmetric key cryptography fails to successfully verify the authenticity of the first electronic component, selectively withholding one of the power connection or the data connection to the first electronic component.

2. The method of claim 1, further comprising, when using the asymmetric key cryptography successfully verifies the authenticity of the first electronic component, utilizing the first electronic component to perform attestation upon the second electronic component.

3. The method of claim 1, further comprising, when using the asymmetric key cryptography successfully verifies the authenticity of the first electronic component, utilizing the first electronic component to perform attestation upon a third electronic component of the plurality of electronic components.

4. The method of claim 1, wherein the second electronic component is soldered to the circuit board.

5. The method of claim 4, wherein the second electronic component is one of a board management controller, a peripheral component interconnect express switch, an Ethernet switch, a dedicated hardware security module.

6. The method of claim 1, the method further comprising communicating with a remote server device to establish the second electronic component as a trusted device.

7. The method of claim 1, wherein using asymmetric key cryptography includes using one of an Edwards-curve Digital Signature Algorithm, an Elliptic Curve Digital Signature Algorithm, or a digital signature algorithm.

8. The method of claim 1, wherein communicating between the first electronic component and a remainder of the plurality of electronic components includes utilizing symmetric key cryptography.

9. The method of claim 1, wherein operating the system further includes receiving the first electronic component as a plug-in device.

10. The method of claim 1, wherein receiving the first electronic component includes connecting the first electronic component to the system with a peripheral component interconnect express link, a wireless link, an Ethernet link, or a serial link.

11. The method of claim 1, wherein utilizing a second electronic component of the plurality of electronic components to perform the attestation upon the first electronic component includes performing the attestation at one of a system boot and after a device reset.

12. A method for attestation of an electronic component upon a circuit board, comprising:
operating an electronic device including:
the circuit board;
a microcontroller attached to the circuit board; and
the electronic component attached to the circuit board, wherein the electronic component provides one of plug-in hardware, configurable hardware, updatable software, configurable software, updatable firmware, configurable firmware, or updatable ownership information to the electronic device;
defining the microcontroller as a trusted device acting as a verifier;
defining the electronic component as an attester under verification;
using asymmetric key cryptography to verify authenticity of the attester under verification with the verifier;
when using the asymmetric key cryptography successfully verifies the authenticity of the attester under verification, selectively enabling one of a power connection and a data connection to the electronic component and communicating between the electronic component and the microcontroller to achieve tangible functions that may be provided by the electronic component and the microcontroller; and
when using the asymmetric key cryptography fails to successfully verify the authenticity of the attester under verification, selectively withholding one of a power connection and a data connection to the electronic component.

13. The method of claim 12, wherein the microcontroller is soldered to the circuit board.

14. The method of claim 12, wherein the electronic device is a first electronic device; and
wherein defining the microcontroller as the trusted device includes verifying the microcontroller as the trusted device with a second electronic device external to the first electronic device.

15. The method of claim 12, wherein defining the microcontroller as the trusted device includes verifying the microcontroller as the trusted device with a remote server device communicating with the electronic device through a wireless communication network.

16. The method of claim 12, wherein the electronic device includes a central compute unit installed to a vehicle; and
wherein the microcontroller includes one of a board management controller of the central compute unit, an Ethernet switch unit of the electronic device, or a peripheral component interconnect express switch unit of the electronic device.

17. The method of claim 12, wherein verifying authenticity of the attester under verification includes:
generating a challenge from the verifier to the attester under verification;
within the attester under verification, answering the challenge with a reply signed with a private key including:
collecting measurements within the attester under verification;
combining the measurements with the challenge with a hash function to create a digest;
signing the digest with the private key to create a signed digest; and
answering the challenge by sending the signed digest to the verifier;
within the verifier, confirming accuracy of the reply by checking the reply with a public key, the challenge, and reference manifest data; and
verifying authenticity of the attester based upon the accuracy of the reply.

18. The method of claim 17, wherein collecting the measurements includes collecting immutable measurements and mutable measurements.

19. The method of claim 18, wherein the immutable measurements include a chip manufacturer identifier, a name of the attester under verification, or a custom identifier; and
wherein the mutable measurements include one of a hash of a bootloader image, a software image, a configuration, a representation of ownership, and results from a secure boot operation.

\* \* \* \* \*